United States Patent

Alfredsson

[15] 3,645,184
[45] Feb. 29, 1972

[54] CONTROL DEVICE FOR VIEWFINDER MIRROR MECHANISM OF SINGLE-LENS REFLEX CAMERAS

[72] Inventor: Alf Ingvar Alfredsson, Savedalen, Sweden
[73] Assignee: Fritz Victor Hasselblad, Goteborg, Sweden
[22] Filed: Dec. 11, 1970
[21] Appl. No.: 97,189

[52] U.S. Cl. .................................................. 95/45
[51] Int. Cl. .......................................... G03b 19/12
[58] Field of Search ........................................ 95/42

[56] References Cited

UNITED STATES PATENTS

| 3,020,815 | 2/1962 | Landrrecht | 95/42 |
| 3,507,199 | 4/1970 | Sato | 95/42 |
| 3,540,365 | 11/1970 | Ishizaka | 95/42 |

Primary Examiner—Samuel S. Matthews
Assistant Examiner—Michael Harris
Attorney—Sommers and Young

[57] ABSTRACT

The viewfinder mirror mechanism of a single-lens reflex camera is provided with a control device comprising a cam disc settable to three different angular positions for controlling the viewfinder mirror mechanism at the release of the camera and at its cocking for a new exposure. The control device operates, for a first position of said disc, to fold up the viewfinder mirror upon release of the camera and folds the mirror down upon completion of said exposure; operates, for a second position of said disc, to fold up said mirror upon release of the camera and to return the mirror to its folded-down position when the camera is cocked for a new exposure; and, in the third position of said disc, does not actuate the viewfinder mirror mechanism, said mirror having been manually folded up prior to the exposure.

6 Claims, 7 Drawing Figures

INVENTOR
Alf Ingvar Alfredsson

BY *Sommers & Young*

ATTORNEYS

CONTROL DEVICE FOR VIEWFINDER MIRROR MECHANISM OF SINGLE-LENS REFLEX CAMERAS

BACKGROUND OF THE INVENTION

This invention relates to single-lens reflex cameras and particularly to a control device for the viewfinder mirror mechanism. The control device is adapted to be adjusted optionally in a simple way to three automatically repeating programs for controlling the viewfinder mirror mechanism, viz A. The viewfinder mirror is folded up upon release of the camera and returns to folded-down position subsequent to exposure, i.e., the so-called quick-return viewfinder mirror.

B. The viewfinder mirror is folded up upon release of the camera and returns to a first folded-down position at commencing film transport and shutter cocking.

C. The viewfinder mirror has been folded up manually in advance by a separate control means and remains at this setting in folded-up position without being actuated by the release mechanism, by film transport, shutter cocking etc.

A well-equipped single-lens reflex camera usually comprises two separate devices adapted to actuate the viewfinder mirror mechanism. The camera always includes a control device, which automatically folds up the viewfinder mirror prior to the exposure by the shutter, and often comprises additional control means rendering it possible manually to fold up the viewfinder mirror prior to the exposure. These latter control means are in certain cases combined with the possibility of opening the auxiliary shutter in front of the film and of stopping down the lens to the present aperture, so that a so-called quick release mechanism is obtained.

In conventional constructions, the control device for the viewfinder mirror mechanism which automatically folds up the viewfinder mirror prior to the exposure by the shutter, has a program according to either A or B above. Originally, the dominating program has been the program according to B which offers the advantages of showing by one look into the viewfinder that the camera is ready for exposure when the object is seen in the viewfinder, and that the viewfinder mechanism operates relatively smoothly and silently. Said program B, however, involves the disadvantage that the object disappears out of sight from one exposure until the camera is ready for the next exposure. This disappearance is troublesome when photographing rapidly moving objects. In cameras with a program according to A, which at present is the program most commonly used, the situation is opposite. The object can be seen all the time in the viewfinder, except for the short moment of exposure by the shutter. However, because of the rapid mirror movements the mechanism operates in a harder way and at a higher sound level, and one cannot see in the viewfinder whether the camera is ready for exposure. The decision of preferring one or the other of these programs depends above all on the object in question and on what the individual photographer desires. Therefore, a control device for the viewfinder mechanism which renders possible a free choice between these programs constitutes a great advantage.

In single-lens reflex cameras with interchangeable lenses, individual lenses, usually wide-angle lenses, project into the camera body such a distance that the viewfinder mirror does not move free of the rear part of the lens, though being guided in a path bulging away from the lens. When photographing with lenses of this kind, the viewfinder mirror must be held in folded-up position and the camera be provided with an external viewfinder. In this case the viewfinder mirror is folded up manually by separate control means, in the way described above. The necessity of holding the viewfinder mirror in folded-up position when photographing with such lenses motivates the control device for the viewfinder mirror mechanism to be equipped with a program according to C. This program is of value also when the exposure is desired to be made as vibration-safe as possible.

SUMMARY OF THE INVENTION

It appears from the above that programs according to A–C can be desirable or necessary when photographing with a single-lens reflex camera, but that conventional constructions only allow for one of the programs according to A or B plus the possibility of manually folding up the viewfinder mirror prior to the exposure. In contrast, the present invention provides a control device wherein the viewfinder mirror mechanism can be adjusted to allow for a free choice between the programs A, B and C. It thereby improves the possibilities of a system single-lens reflex camera satisfying different demands at different times. The adjustment is made by a member located at the key for film winding, shutter cocking etc. Said member has three setting positions, one for each program, corresponding to three different angle positions of a cam disc mounted on the key shaft. This cam disc constitutes the guiding and cocking part in the control device for the viewfinder mirror mechanism.

BRIEF DESCRIPTION OF THE DRAWINGS

A preferred embodiment of the invention is described in greater detail in the following, with reference to the accompanying drawings, in which.

DESCRIPTION OF THE PREFERRED EMBODIMENTS

Figure 1:
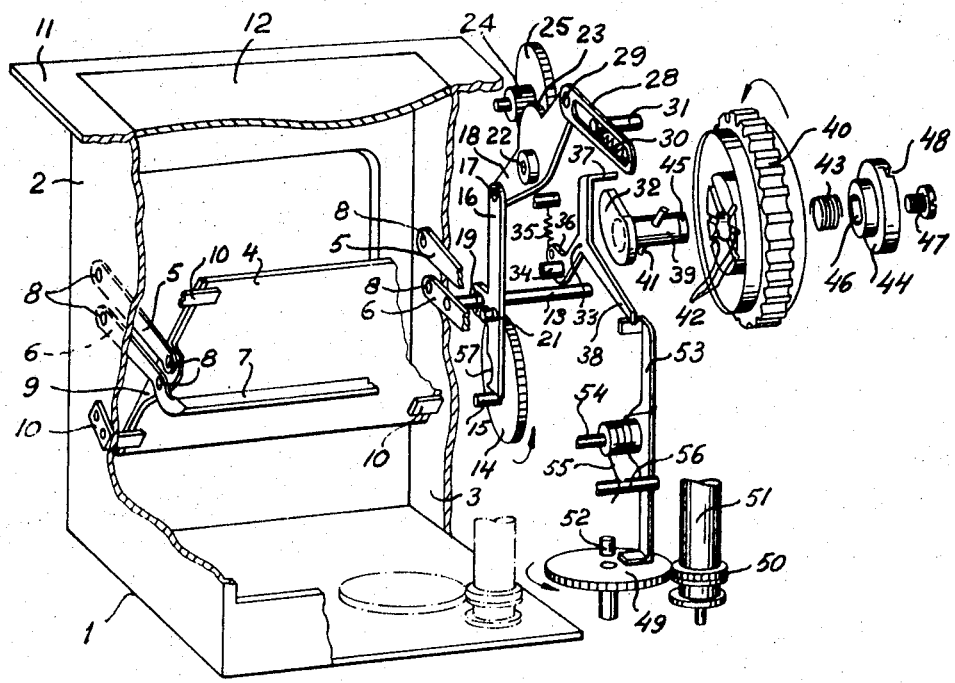
FIG. 1 shows an exploded view of the camera body seen from the rear side of the camera, with a known viewfinder mirror mechanism and a control device therefor according to the invention, which control device is in cocked position at the program corresponding to A, parts of the camera body and viewfinder mirror mechanism being cut away.

In a camera body 1, FIG. 1, a viewfinder mirror mechanism of known design is mounted between the left-hand 2 and, respectively, right-hand 3 sidewall of the camera body 1. A viewfinder mirror 4 is movably suspended in two pairs of hinge arms, one upper pair 5 and one lower pair 6, which latter arms are connected with a transverse parallel guide bar 7 some distance behind the viewfinder mirror 4. Said hinge arms 5, 6 are supported on studs 8 secured on the sidewalls 2, 3 in lugs 9 on the lateral edges of the viewfinder mirror, in such a manner, that the viewfinder mirror 4 moves in a guided path between folded-down position, FIGS. 1 and 2, and folded-up position, FIG. 3, or vice versa. In its folded-down position, FIG. 1, the viewfinder mirror rests against stationary supports 10 in the sidewalls 2, 3, and in its folded-up position it rests against a sealing frame (not shown) below a ground glass screen 12 located in the upper surface 11 of the camera body 1. The viewfinder mirror mechanism is operated by a control stud 13 fastened in the right-hand arm of the lower hinge arms 6.

On the right-hand sidewall 3, FIG. 1, a control device for the viewfinder mirror mechanism according to the invention is mounted. The driving part of said device is a drive wheel 14 the function of which is described below. It comprises a carrier pin 15 transferring the drive to a mirror driver 16 mounted at its upper end on a stud 17 in a lever 18. The mirror driver 16 is provided with a longitudinal hole 19, which encloses the control stud 13. A tension spring 20 (see FIGS. 2 and 3) secured about the control stud 13 and about a pin 21 on the mirror driver 16 tries to turn the mirror driver 16 clockwise, seen from the interior of the camera body 1. The lever 18 is supported on a journal 22 and includes a toothed sector 23, which via cogwheels 24, 25 and 26 drives a centrifugal governor 27 of a construction known per se, FIGS. 2 and 3. The object of said centrifugal governor 27 is to cushion the movements of the viewfinder mirror mechanism. For stabilizing the upper and lower end positions of the viewfinder mirror mechanism, the lever 18 is actuated by a spring rocker 28 of known type, which is pivoted about a journal 29 on the lever 18, and the spring 30 of which is secured in a stationary stud 31 in the right-hand sidewall 3. If required, a second spring rocker (not shown) is mounted in a similar way on one of the left-hand hinge arms 5 and 6, respectively.

The guiding and cocking part of the control device comprises a cam disc 32, which is sensed by an angular lever 37 on a return member 33 supported on a journal 34 in the right-hand sidewall 3. The cam disc 32 has a curvature ascending uniformly from its lowermost point about 260° whereafter the height constantly is about 50°, and the final point is connected with the lowermost point by a straight line which by smoothly rounded transitions joins the curve. The return member 33 tries to rotate clockwise, seen from the interior of the camera body 1, FIGS. 1-3, by action of a tension spring 35 secured in a lug 36 on the return member 33 and, respectively, in the sidewall 3. A lower straight lever 38 on the return member 33 is comprised in a release mechanism described below.

The angular position of the cam disc 32 determines which of the above programs according to A-C the control device is to carry out when the camera is released. The three positions to be assumed by the cam disc 32 for the control function in question are set by a selector means, FIG. 1, assembled with a key 40 on the shaft 39 of the cam disc 32. Said key 40 is identical with the key used with transfer means (not shown) for film transport, shutter cocking etc. The angular position between the shaft 39 with its cam disc 32 and key 40 is determined by the position occupied by the carrier pin 41 in one of three carrier grooves 42 provided on the inside of the key 40 and corresponding to the respective control functions. By turning the key 40 at film transport etc., through one full revolution, the cam disc 32 always assumes the same angular position corresponding to the carrier groove 42 in question. The key 40 is pressed against the carrier pin 41 by a compression spring 43, which at its opposite end abuts a shift member 44 countersunk in the key 40. The flattened end 45 of the shaft 39 projects into a corresponding central bore 46 in the shift member 44, thereby fixing its angular position in relation to the shaft 39 and the cam disc 32. A screw 47 countersunk in the shift member 44 and fastened in the shaft 39 holds the selector means assembled. The shift member 44 includes a groove 48 adapted to be set against an optional index (not shown) for the control function of the key 40. To adjust the selector means, a coin or the like is inserted in the groove 48, and the shift member 44 is pressed inwards until the carrier pin 41 disengages from groove 42 in which it was kept resting by action of the compression spring 43. The shift member 44 then is turned to the index on key 40 corresponding to the desired control function, whereafter the pressing force is reduced sufficiently to permit the carrier pin 41 to slide into that one of the grooves 42 which corresponds to the new setting position. The control device, in principle can be adjusted in cocked state as well as in released state. In released state, however, the adjustment requires more power, because the tension spring 35 has to be tensioned, the friction between the cam disc 32 and the angular lever 37 has to be overcome, etc. This may be difficult to carry out, if there is only a small coin available for making the adjustment. The adjustment, therefore, is restricted for practical reasons to the control device in cocked state.

The locking and releasing part of the control device is controlled by a movement deflected from the camera shutter, which movement in the embodiment shown is taken from the drive mechanism for the second roller blind part of the roller blind-type shutter. A spring-wound motor (not shown) drives a cogwheel 49 meshing with a gear rim 50 on a shaft 51 for the second part of the shutter, FIGS. 1-3. On said cogwheel 49 is arranged a release pin 52 for actuating a locking arm 53 rotating about a stud 54 in the right-hand sidewall 3. A spring 55 tries to turn the locking arm 53 counterclockwise, seen from the interior of the camera, such that the locking arm when it is not actuated by the release pin 52 rests against a stop pin 56 secured in the right-hand sidewall 3. Against the upper portion of the locking arm 53 rests in locked position, FIGS. 1 and 2, the straight lever 38 on the return member 33. Said locking arm 53 is straight as shown in FIG. 1, but in FIGS. 2 and 3 it is given a slightly angular shape in order to improve the clarity of these Figures.

The function of the control device for the viewfinder mechanism can be divided into two steps, viz the action in connection with the cocking of the control means, and the action upon its release.

When cocking the control means for the viewfinder mirror mechanism, which is made in connection with the film transport, shutter cocking etc., the key 40, FIG. 1, is turned one full revolution in the direction of the arrow to a fixed stop position (not shown), the cam disc 32 on the common shaft 39 thereby also rotating a full revolution. The drive wheel 14 and cogwheel 49, by assistance of gear means (not shown), rotate with some delay (about 5°) somewhat less than one full revolution in the direction opposite to that shown by the arrows on the respective wheels in FIGS. 1 and 2. The locking arm 53, in its released state, always stays in the backward position into which it has been moved by the release pin 52 on the cogwheel 49, as shown in FIG. 3. When upon rotation of the key 40 the cogwheel 49 starts to rotate opposite to the direction of the arrow in FIG. 1, the locking arm 53 commences its movement, subsequent to the aforementioned delay, to the locked position, FIGS. 1 and 2, by action of the spring 55. The release pin 52 disengages from the locking arm 53 at an early stage of the full revolution performed by the cogwheel 49 during the cocking, so that the locking arm 53 will be in the locking position, FIGS. 1 and 2, immediately after the cocking has been started.

The aforedescribed course of events at the cocking operation is identical, irrespective of to which of the programs A-C the control means has been set. The remaining events depend on the program set and are described individually in the following. It is presupposed, according to what has been mentioned before, that for practical reasons the adjustment of the control function always is made with the control device in cocked state. This means, that the cocking always takes place with a program, which is the same as at the next preceding release operation. In this way, three different courses of events for the program in question according to A-C are obtained. It is to be mentioned merely that, if the control device is adjusted in released state, which is possible but less suitable for the aforesaid practical reasons, then with three control functions 3×3=9 different courses of events are obtained at the cocking. The cases when the cocking is made with a program set different from that at the next foregoing release, are of minor interest and, therefore, they are neglected here and the description is restricted to the aforesaid three cases.

Figure 7:
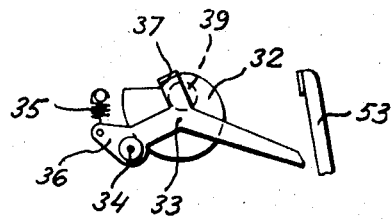
Figure 2:
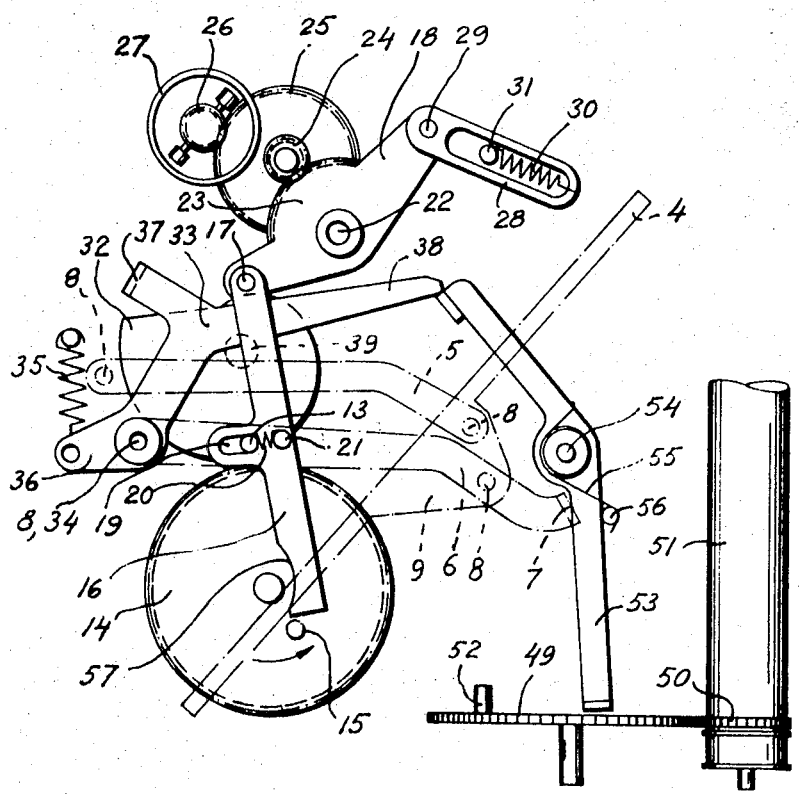
FIG. 2 shows a plan view of the control device corresponding to FIG. 1 seen from the inside of the camera body.
Figure 3:
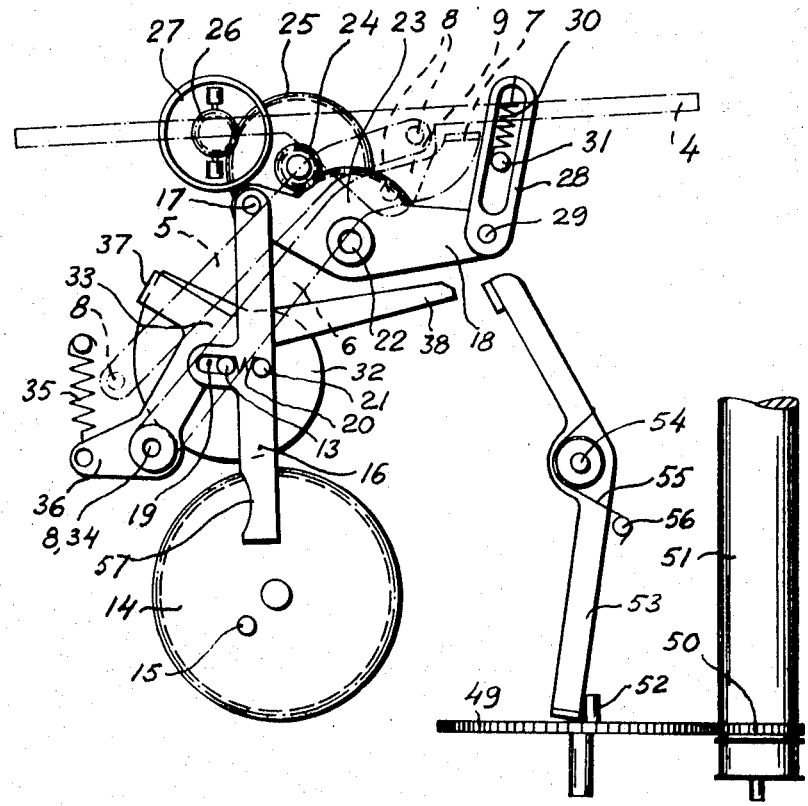
FIG. 3 shows a plan view corresponding to FIG. 2, but in released position at the program corresponding to B.

With the program according to A the viewfinder mirror 4 is already in folded-down position when the cocking operation commences, FIG. 2. As the drive wheel 14 rotates in the direction opposite to the arrow in FIG. 2, the carrier pin 15 meets the mirror driver 16 at its lower end portion, which is provided with an arc-shaped recess 57. The mirror driver 16 is thereby pressed aside and, thus, allows the carrier pin 15 to move to its end position shown in FIG. 2. The control stud 13 thereby moves to its left-hand end position in the longitudinal hole 19, and the tension spring 20 is tensioned. The carrier pin 15 having moved past the mirror driver 16, the driver springs back into its starting position. In parallel, the cam disc 32, which starts in the position shown in FIG. 7, cocks the return member 33 during about three quarters of a revolution so that the straight lever 38 is set on the upper portion of the locking arm 53. The control means is now in the position shown in FIGS. 1, 2 and 4.

With the program according to B the control device is in the position shown in FIG. 3 when the cocking operation commences. At the cocking, the angular lever 37 on the return member 33 slides down from the highest portion of the cam curve 32 along the straight portion thereof. Thereby the return member 33, by action of the tension spring 35, presses down the control stud 13. Said stud actuates the viewfinder mirror mechanism, so that the viewfinder mirror is folded down and the straight lever 38 on the return member 33 is set on the upper portion of the locking arm 53. The viewfinder mirror 4 is folded down at the beginning of the cocking operation and, therefore, the mirror driver 16 already has arrived at its lower position when the carrier pin 15, due to rotation of the drive wheel 14, arrives at the mirror driver 16. The operation, therefore, is here the same as described for the control function according to A. Upon completed cocking operation the control device assumes the position shown in FIG. 2, with the exception of the cam disc 32 which is set in the position shown in FIG. 5.

Figure 6:
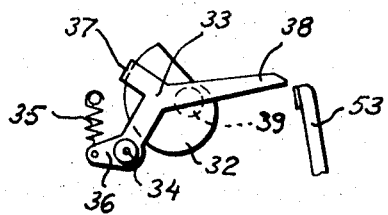

With the program according to C the viewfinder mirror 4 is folded up in advance by a separate control member (not shown) and remains in folded-up position during and after the cocking operation The angular lever 37 on the return member 33, FIG. 6, is in the transition between the ascending part of the cam curve 32 and the part with constant height. In this retracted position on the curve, the return member 33 during the rotation of the cam disc 32 is held in unchanged position for a period which is sufficient for the locking arm 53 to assume locked position, FIGS. 1 and 2, in the aforedescribed way and to set the straight lever 38. Therefore, the mirror driver receives no impulse for moving downwards, and the viewfinder mirror remains folded-up. The drive wheel 14 rotates in the aforedescribed way, but the carrier pin 15 runs free below the mirror driver 16.

Upon release of the control means for the viewfinder mirror mechanism which is initiated by the release button of the camera, the drive wheel 14 and cogwheel 49, FIGS. 1-3, are rotated in the direction of the arrows back to their aforedescribed starting positions prior to the cocking operation. The drive wheel 14 starts without delay, but the cogwheel 49 comprised in the shutter mechanism starts with delay, owing to the fact that the shutter is not released unless the viewfinder mirror 4 in applicable cases has arrived at its upper end position, which occurs when the drive wheel 14 has been turned through 180°. In the following, the events are described which take place with the remaining control device details at the program in question according to A-C.

Figure 4:
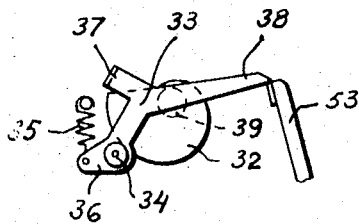
FIGS. 4–7 show plan views, seen from the inside of the camera body, of those details which determine the control functions, FIGS. 4, 5 and 6 corresponding to the programs according to A, B and C, and FIG. 7 showing the positions occupied by the details when the catch for the control device is released at the program according to A.

At the program according to A the viewfinder mirror 4 is in folded-down position, FIGS. 1 and 2, and the cam disc 32 as well as the return member 33 occupy the positions shown in FIG. 4. The carrier pin 15 on the drive wheel 14 is located immediately below the mirror driver 16 and (upon rotation of the drive wheel 14) presses said driver upwards, together with the control stud 13, which folds up the viewfinder mirror 4. Hereafter the shutter is released by a device (not shown) and exposes, whereby the cogwheel 49 is turned. Towards the end of this rotary movement the release pin 52 arrives at the locking arm 53, and at the moment when the shutter is being closed the pin 52 moves aside the arm 53 so that the straight lever 38 on the return member 33 is released. The return member 33 then falls down with its angular lever 37 onto the cam disc 32 in the position shown in FIG. 7, by action of the tension spring 35, and the return member 33 presses down the control stud 13, which in the aforedescribed way so actuates the viewfinder mirror mechanism that the viewfinder mirror 4 subsequent to completed exposure is folded down. All details have now been returned to the positions they had occupied prior to the cocking operation.

Figure 5:
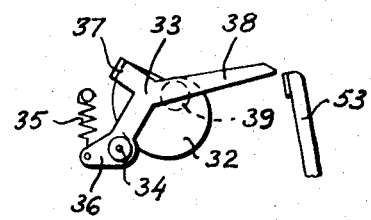

At the program according to B the details are in the same starting positions as described in connection with program A, with the exception of the cam disc 32, which occupies the position shown in FIG. 5. The releasing operation corresponds to that described for the program A up to the moment when the locking arm 53 is disengaged from the straight lever 38 on the return member 33. The angular lever 37 on the return member 33 rests upon the highest portion of the cam disc 32, FIG. 5, and prevents the tension spring 35 from turning the return member 33. Consequently, the control stud 13 is not actuated and the viewfinder mirror 4, subsequent to the exposure, remains in folded-up position.

At the program according to C the viewfinder mirror 4 is folded up manually in advance by a control means (not shown). The cam disc 32 and the return member 33 occupy the positions shown in FIG. 6. The locking arm 53 and cogwheel 49 with the release pin 52 are in the positions shown in FIG. 2. The remaining details are in the positions shown in FIG. 3. The release of the camera and the turning of the drive wheel 14 do not effect any action, because the carrier pin 15 is out of contact with the mirror driver 16, which is already in its upper position. When the release pin 52 finally, upon rotation of the cogwheel 49, moves the locking arm 53 to released position, FIG. 2, the angular lever 37 on the return member 33 remains at the high portion of the cam disc 32 and prevents the spring 35 from turning the return member 33 so that it presses down the control stud 13 and folds down the viewfinder mirror 4. At the program according to C, thus, the viewfinder mirror mechanism remains in folded-up position when the camera is being released.

The invention is not restricted to the embodiment shown, but may be varied as to its details within the scope of its basic idea. The drive means 14, 15 for the mirror driver 16, for example, and the locking means 49, 52, 53 may be designed so as to be adapted for the individual camera construction. The force from the control stud 13 may also be deflected in a suitable way so as to drive a viewfinder mirror mechanism of a construction different from that shown.

I claim:

1. In a single-lens reflex camera, a viewfinder mirror mounted for movement between folded-up and folded-down positions, a control device for controlling the positioning of said viewfinder mirror, said control device comprising a cam mounted for selective movement to three different predetermined angular positions, and control means responsive to the angular position of said cam for controlling said mirror at the release of the camera and at its cocking for a new exposure, said control means including means operable, when said cam is in a first one of said three angular positions, to fold up said viewfinder mirror at the release of the camera and to fold it down upon completion of the exposure, said control means including means operable, when said cam is in a second one of said three angular positions, to fold up said mirror at the release of the camera and to return it to its folded-down position when the camera is being cocked for a new exposure, and said control means including means operable, when said cam is in the third one of said angular positions, to avoid actuating said viewfinder mirror with said viewfinder mirror having been folded up manually by a separate control means prior to the exposure.

2. The structure of claim 1 wherein said cam comprises a cam disc having a cam curve comprising three different portions merging into one another, said cam curve including a first long cocking portion which ascends uniformly from the lowermost point of the cam disc to its uppermost point where the curve merges into a second short resting position portion having constant height, said second portion in turn merging into a relatively short, straight return and neutral position portion which terminates the cam curve.

3. The structure of claim 1 including means for adjusting the angular position of said cam, said angle adjusting means comprising a key mounted on a shaft for turning through a full revolution against a fixed stop member at the cocking of said camera, said cam also being mounted on said shaft, means for detachably coupling said cam to said key comprising a pin outstanding from said shaft, said pin being adapted to enter any one of three grooves provided in said key, a shift member mounted on said shaft on the side of said key remote from said cam, and a compression spring surrounding said shaft between said key and said shift member, said shift member being adapted to be pressed inwardly toward said key and then to be turned thereby to adjust the position of said pin relative to said grooves.

4. The structure of claim 1 wherein said control means includes a return member supported on a journal, a locking arm spaced from said return member, said return member including an angular lever and also including a straight lever, and a tension spring for actuating said return member to a cocked position, wherein, in dependence upon the positioning of said cam, said angular lever rests against the highest portion of said cam disc or said straight lever rests against said locking arm, and wherein, when in its released position and in dependence upon the positioning of said cam, said return member either presses down a control stud for the viewfinder mechanism, thereby to fold down the viewfinder mirror, or said return member remains in resting position with said angular lever disposed against the highest portion of said cam thereby to prevent the viewfinder mirror from being folded down.

5. The structure of claim 1 wherein said control means includes a mirror driver for operating the viewfinder mirror mechanism from folded-down to folded-up position, said mirror driver including an arc-shaped recess, a carrier pin mounted on a drive wheel for movement upon cocking of said camera, and spring means operable to effect a resilient turning of said mirror driver when said carrier pin, upon cocking of said camera, meets said arc-shaped recess on said mirror driver, said carrier pin operating to press said mirror driver upwards when said drive wheel, upon release of the camera, rotates in opposite direction thereby to effect folding up of the viewfinder mirror.

6. The structure of claim 4 wherein said locking arm is actuated for movement by a spring, said locking arm being adapted to pivot about a stud to a locked position wherein said locking arm rests against a stop pin with the end of the locking arm which faces said return member being in locking position relative to said straight lever on said return member, the opposite end of said locking arm, when in said locked position, being spaced from a release pin mounted for movement under the guidance of the camera shutter, said release pin being operative to move aside said locking arm in the final phase of the exposure, so that said straight lever on the return member is free for movement relative to said locking arm.

* * * * *